United States Patent [19]
Partridge et al.

[11] 3,982,959
[45] Sept. 28, 1976

[54] SODIUM-SULPHUR BATTERY CELLS

[75] Inventors: Bernard Austin Partridge, Cothill, near Abingdon; Thomas Rhys Jenkins, East Hendred; Michael McGuire, Sinfin, all of England

[73] Assignee: The Secretary of State for Industry in Her Britannic Majesty's Government of the United Kingdom of Great Britain and Northern Ireland, London, England

[22] Filed: Mar. 7, 1975

[21] Appl. No.: 556,500

[30] Foreign Application Priority Data
Mar. 11, 1974 United Kingdom............... 10835/74

[52] U.S. Cl................................ 429/163; 429/31; 429/34; 429/185
[51] Int. Cl.²........................................ H01M 10/00
[58] Field of Search................... 136/6 FS, 83 T, 20

[56] References Cited
UNITED STATES PATENTS

| | | |
|---|---|---|
| 3,255,049 | 6/1966 | Wolfe ................................. 136/107 |
| 3,413,150 | 11/1968 | Kummer et al..................... 136/6 FS |
| 3,514,332 | 5/1970 | Minck ................................ 136/6 FS |
| 3,770,502 | 11/1973 | Nakobayashi ..................... 136/6 FS |
| 3,811,943 | 5/1974 | Minck et al. ...................... 136/6 FS |
| 3,837,918 | 9/1974 | Nakobayashi ..................... 136/6 FS |
| 3,841,912 | 10/1974 | Kogarva et al. .................... 136/6 FS |

Primary Examiner—John H. Mack
Assistant Examiner—C. F. Lefevour
Attorney, Agent, or Firm—Larson, Taylor and Hinds

[57] ABSTRACT

In a sodium-sulphur battery cell of tubular form, the sulphur compartment is provided inside a tubular solid electrolyte. The sodium compartment is provided by the annular space between the solid electrolyte and a metal casing. A carbon current collector extends into the sulphur compartment. A stainless steel mesh disposed in the sodium compartment adjacent to the solid electrolyte acts as a wick for sodium.

4 Claims, 1 Drawing Figure

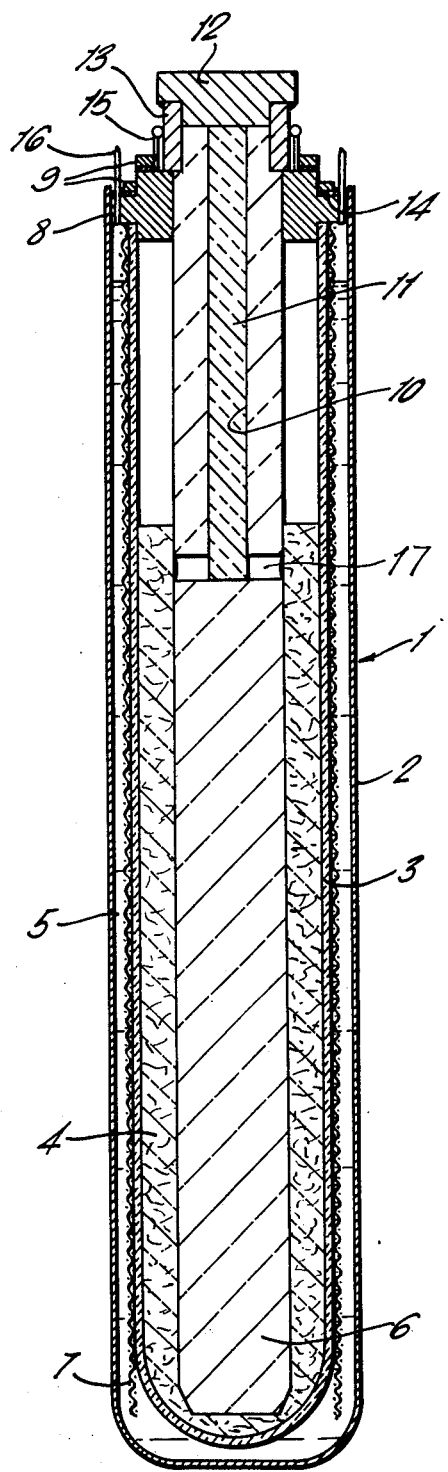

SODIUM-SULPHUR BATTERY CELLS

BACKGROUND OF THE INVENTION

This invention relates to sodium-sulphur battery cells of the type wherein sodium and sulphur reactants are contained in a casing and are separated from each other by a solid electrolyte through which sodium ions may be transferred.

One of the problems associated with such cells is in avoiding corrosion attack on metallic structural components used in the construction of the cell. This corrosive attack mainly arises from the electro-chemical reactions taking place adjacent to the cathode, and from the chemical nature of sulphur.

It is therefore an object of the invention to provide a sodium-sulphur battery cell in which this problem of corrosion is to some extent overcome.

SUMMARY OF THE INVENTION

According to the invention, a sodium sulphur battery cell comprises a metal casing, a solid electrolyte of tubular form closed at one end and disposed within the casing so as to define an inner compartment for sulphur and an outer, annular compartment for sodium which bounds the inner compartment, a carbon current collecting means disposed in the inner compartment for collecting current generated by electro-chemical reaction between the sulphur and the sodium, and means disposed in the outer compartment adjacent to the solid electrolyte for drawing up sodium to "wet" those parts of the solid electrolyte above the level of sodium.

The arrangement avoids contact between the metal casing and the sulphur.

BRIEF DESCRIPTION OF THE DRAWING

An embodiment of the invention will now be described by way of example with reference to the accompanying drawing which is a fragmentary side view in medial section.

DETAILED DESCRIPTION

Referring to the drawing, a sodium-sulphur battery cell 1 comprises a metal casing 2, a solid electrolyte 3 of beta-alumina ceramic and of tubular form disposed lengthwise within the casing 2 so as to define an inner compartment 4 for sulphur and an outer, annular, compartment 5 for sodium which bounds the inner compartment 4, and a circular-section carbon rod 6 disposed in the inner compartment so as to serve as means for collecting current generated by electro-chemical reaction between the sulphur and the sodium.

In further detail, the casing 2 comprises a blind-ended tube of stainless steel. The electrolyte 3 is of the same form and a stainless steel mesh 7 of tubular form is disposed adjacent the outer surface of the electrolyte 3 to serve as a "wick" in drawing up sodium by capillary action to "wet" those parts of the membrane 3 above the level of sodium as the level falls. Sulphur-impregnated carbon felt is disposed between the carbon rod 6 and inner surface of the electrolyte 3 to assist the carbon rod in collecting current.

The upper end of the carbon rod 6 is a close sliding fit in an end cap 8 of alpha-alumina. A metal flange 14 is welded to the inside of the casing 2, and is bonded between the end cap 8 and an alpha-alumina backing ring 9 using a ceramic/metal seal. The end cap 8 also supports the electrolyte 3, the two components being attached to each other by a glass frit seal. A metal seal 15 is also bonded to the end cap 8 between an alpha-alumina backing ring 9 using a ceramic/metal seal.

Sulphur is supplied to the inner compartment 4 by way of a filling hole 10 formed in the centre of carbon rod 6 connecting with a transverse hole 17. After insertion of the sulphur the hole 10 is sealed by a carbon plug 11, and a chromium-steel plug 12 is inserted in and welded to a screwed connector 13 of the same material fitted to a recessed section at the top of the carbon rod 6 and welded to the metal seal 15. The outer compartment 5 is filled with sodium by way of a tube 16 subsequently sealed by a weld-joint.

When the cell 1 discharges, sodium ions are conducted through the tubular electrolyte 3 (which is conductive to sodium ions only) to combine with sulphur ions, resulting in an electro-chemical reaction whereby a current is generated which is picked up by the carbon felt and carbon rod 6 in the inner compartment 4. The casing 2 serves as a negative electrode and the plug as a positive electrode.

The arrangement has the advantage that the corrosive sulphur is kept out of contact with structural metallic components of the battery cell 1 thus avoiding metallic corrosion. Instead, the sulphur-contacting materials of the cell 1 are alpha-alumina, beta-alumina and carbon, all of which have good resistance to corrosion. The parts of the cell 1 in contact with sodium are not subjected to such a corrosive environment as that in the inner sulphur compartment 4, and therefore metals may be used without serious risk of corrosion.

Although carbon has a higher electrical resistance than metals previously used as current collecting means, this is acceptable for many applications of sodium-sulphur battery cells.

We claim:

1. A sodium-sulphur battery cell comprising a metal casing of blind-ended tubular form, a solid electrolyte of blind-ended tubular form disposed within the casing so as to define an inner compartment having sulphur as one of the cell reactants and an outer compartment having sodium as the other reactant, a carbon current collecting means of rod-like form disposed lengthwise within the inner compartment for collecting current from electro-chemical reaction between the sodium and sulphur, a packing of carbon felt disposed in the space between the current collector and the solid electrolyte and impregnated with said sulphur, means in the outer compartment adjacent to the surface of the solid electrolyte for drawing up sodium to wet those parts of the solid electrolyte above the level of sodium, a ceramic end cap supporting the solid electrolyte and joined by sealing means with the casing so as to close the sodium compartment, one end of the current collector extending through a fitting hole in the end cap so as to close the sulphur compartment, a metal connector to which said one end of the current collector is electrically connected, and sealing means joining the connector with a portion of the end cap electrically insulated from the casing.

2. A sodium-sulphur battery cell as claimed in claim 1, wherein the means comprises a stainless steel mesh of tubular form disposed adjacent to the outer surface of the solid electrolyte.

3. A sodium-sulphur battery cell as claimed in claim 1, wherein the current collector is adapted to permit feeding of liquid sulphur into the inner compartment through a central hole in the connector by providing a filling hole lengthwise extending from said one end of the current collector and connecting with a transverse hole extending to the surface of the current collector in the inner compartment, and a metal plug is provided to fill the central hole, said metal plug being joined to the connector.

4. A sodium-sulphur battery cell as claimed in claim 3, wherein a carbon plug is provided to seal the filling hole.

* * * * *